US009030453B2

(12) United States Patent
Cho et al.

(10) Patent No.: US 9,030,453 B2
(45) Date of Patent: May 12, 2015

(54) LIQUID CRYSTAL DISPLAY DRIVING CIRCUIT WITH LESS CURRENT CONSUMPTION

(75) Inventors: Hyun Ho Cho, Incheon-si (KR); Young Icc Jung, Incheon-si (KR); Young Suk Son, Daejeon-si (KR); Joon Ho Na, Daejeon-si (KR); Hyung Seog Oh, Cheongju-si (KR); Dae Seong Kim, Daejeon-si (KR); Dae Keun Han, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 739 days.

(21) Appl. No.: 13/201,989

(22) PCT Filed: Jan. 29, 2010

(86) PCT No.: PCT/KR2010/000557

§ 371 (c)(1), (2), (4) Date: Aug. 17, 2011

(87) PCT Pub. No.: WO2010/095819

PCT Pub. Date: Aug. 26, 2010

(65) Prior Publication Data

US 2011/0298769 A1 Dec. 8, 2011

(30) Foreign Application Priority Data

Feb. 18, 2009 (KR) ........................ 10-2009-0013336

(51) Int. Cl.
*G06F 3/038* (2013.01)
*G09G 5/00* (2006.01)
*G09G 3/36* (2006.01)

(52) U.S. Cl.
CPC ............ *G09G 3/3688* (2013.01); *G09G 3/3614* (2013.01); *G09G 2330/021* (2013.01)

(58) Field of Classification Search
CPC ................. G09G 2310/0297; G09G 2330/021
USPC ............................................ 345/209, 212, 96
See application file for complete search history.

(56) References Cited

U.S. PATENT DOCUMENTS

| | | | | |
|---|---|---|---|---|
| 6,970,152 | B1 * | 11/2005 | Bell et al. | 345/100 |
| 7,123,231 | B2 * | 10/2006 | Honda | 345/96 |
| 7,911,437 | B1 * | 3/2011 | Bell | 345/100 |
| 8,508,515 | B2 * | 8/2013 | Wang et al. | 345/204 |

(Continued)

FOREIGN PATENT DOCUMENTS

| | | |
|---|---|---|
| CN | 1365185 | 8/2002 |
| CN | 1846246 | 10/2006 |

(Continued)

OTHER PUBLICATIONS

International Search Report, Application No. PCT/KR2010/000557, dated Oct. 13, 2010.

(Continued)

*Primary Examiner* — Andrew Sasinowski
*Assistant Examiner* — Mihir Rayan
(74) *Attorney, Agent, or Firm* — Kile Park Reed & Houtteman PLLC

(57) ABSTRACT

An LCD driving circuit includes a first buffer configured to have a terminal for a first voltage, a terminal for a second voltage and a terminal for an intermediate voltage between the first voltage and the second voltage, and be driven in a range from the first voltage to the intermediate voltage; and a second buffer configured to have a terminal for the first voltage, a terminal for the second voltage and a terminal for the intermediate voltage, and be driven in a range from the intermediate voltage to the second voltage. The terminal for the intermediate voltage of the first buffer and the terminal for the intermediate voltage of the second buffer are connected with each other, and the first voltage is a highest voltage, the second voltage is a lowest voltage, and the intermediate voltage is in a range from the first voltage to the second voltage.

20 Claims, 5 Drawing Sheets

(56) References Cited

U.S. PATENT DOCUMENTS

| | | | | |
|---|---|---|---|---|
| 2003/0201959 | A1 | 10/2003 | Sakaguchi | |
| 2005/0134546 | A1 | 6/2005 | Woo et al. | |
| 2006/0164374 | A1 * | 7/2006 | Chang et al. | 345/100 |
| 2006/0214898 | A1 | 9/2006 | Woo et al. | |
| 2007/0046614 | A1 * | 3/2007 | Chien | 345/100 |
| 2007/0171169 | A1 * | 7/2007 | Hirama | 345/94 |
| 2007/0290979 | A1 | 12/2007 | Lee et al. | |
| 2008/0278427 | A1 * | 11/2008 | Jang et al. | 345/98 |
| 2011/0018853 | A1 * | 1/2011 | Kawagoshi | 345/211 |
| 2011/0157129 | A1 * | 6/2011 | Song et al. | 345/211 |
| 2011/0164006 | A1 * | 7/2011 | Son et al. | 345/204 |
| 2012/0161661 | A1 * | 6/2012 | Cho et al. | 315/241 R |

FOREIGN PATENT DOCUMENTS

| | | | |
|---|---|---|---|
| CN | 1917027 | | 2/2007 |
| JP | 09-197371 | A | 7/1997 |
| JP | 2001-066568 | A | 3/2001 |
| JP | 2004-317760 | | 11/2004 |
| JP | 2004-317760 | A | 11/2004 |
| JP | 2006-126471 | | 5/2006 |
| JP | 2006-126471 | A | 5/2006 |
| KR | 10-2007-000047 | | 1/2007 |
| KR | 10-2007-0120221 | | 12/2007 |
| TW | 200719315 | | 5/2007 |
| TW | 200802226 | | 1/2008 |
| TW | 200839720 | | 10/2008 |

OTHER PUBLICATIONS

Written Opinion of the International Searching Authority, Application No. PCT/KR2010/000557, dated Oct. 13, 2010.

* cited by examiner

LIQUID CRYSTAL DISPLAY DRIVING CIRCUIT WITH LESS CURRENT CONSUMPTION

BACKGROUND OF THE INVENTION

1. Field of the Invention

The present invention relates to a liquid crystal display driving circuit, and more particularly, to a liquid crystal display driving circuit with low current consumption, which can reduce an amount of current consumed during charging and discharging processes when driving a liquid crystal display.

2. Description of the Related Art

Liquid crystal displays (LCDs) refer to devices which display image data by passing light through liquid crystals by using a characteristic that the alignment of liquid crystal molecules is changed depending upon an applied voltage.

In circuits and systems for driving such LCDs, current consumption is regarded as one of very important factors. If current consumption increases, as the temperature of an LCD driving circuit and system rises, the reliability and the lifetime of the LCD driving circuit and system are likely to be degraded and shortened. Also, if current consumption increases in an LCD driving circuit and system applied to a mobile terminal, as the available service time of a battery is shortened, the run time of the mobile terminal is shortened.

FIG. 1 is a view illustrating a current consuming process when a conventional LCD driving circuit drives a panel.

In order for an LCD driving circuit to drive an LCD panel, the data lines of the LCD panel should be driven, and in this process, current consumption occurs.

The data line of the LCD panel serves as an R/C load composed of a resistor and a capacitor when viewed in terms of an equivalent circuit. In order for the LCD driving circuit to drive the LCD panel, the R/C load should be charged and discharged.

That is to say, when it is necessary to drive a level higher than a previous level, the LCD driving circuit should be supplied with charges at a first voltage VDD and charge the R/C load, and when it is necessary to drive a level lower than a previous level, the LCD driving circuit should discharge the charges charged in the R/C load through a second voltage VSS.

In order for the LCD driving circuit to drive the LCD panel, this process should be continuously repeated, during which current is consumed.

When the LCD driving circuit drives the LCD panel according to the conventional art as described above, because the charges supplied at the first voltage VDD are used only once and are discharged to the second voltage VSS, current consumption of the LCD driving circuit and system increases, and due to this fact, a temperature rises.

If current consumption increases and a temperature rises, the reliability and the lifetime of the LCD driving circuit and system are likely to be respectively degraded and shortened. Also, in the case of an LCD driving circuit and system applied to a mobile terminal, as the available service time of a battery is shortened, the run time of the mobile terminal may be also shortened.

SUMMARY OF THE INVENTION

Accordingly, the present invention has been made in an effort to solve the problems occurring in the related art, and an object of the present invention is to provide an LCD driving circuit with low current consumption, in which output buffers of an LCD driving circuit additionally have an intermediate voltage terminal such that charges discharged during a discharging process of a first buffer can be used in a charging process of a second buffer, thereby reducing current consumption.

In order to achieve the above object, according to the present invention, there is provided an LCD driving circuit comprising a first buffer configured to have a terminal for a first voltage, a terminal for a second voltage and a terminal for an intermediate voltage between the first voltage and the second voltage, and be driven in a range from the first voltage to the intermediate voltage; and a second buffer configured to have a terminal for the first voltage, a terminal for the second voltage and a terminal for the intermediate voltage, and be driven in a range from the intermediate voltage to the second voltage, wherein the terminal for the intermediate voltage of the first buffer and the terminal for the intermediate voltage of the second buffer are connected with each other, and wherein the first voltage is a highest voltage, the second voltage is a lowest voltage, and the intermediate voltage is in a range from the first voltage to the second voltage.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
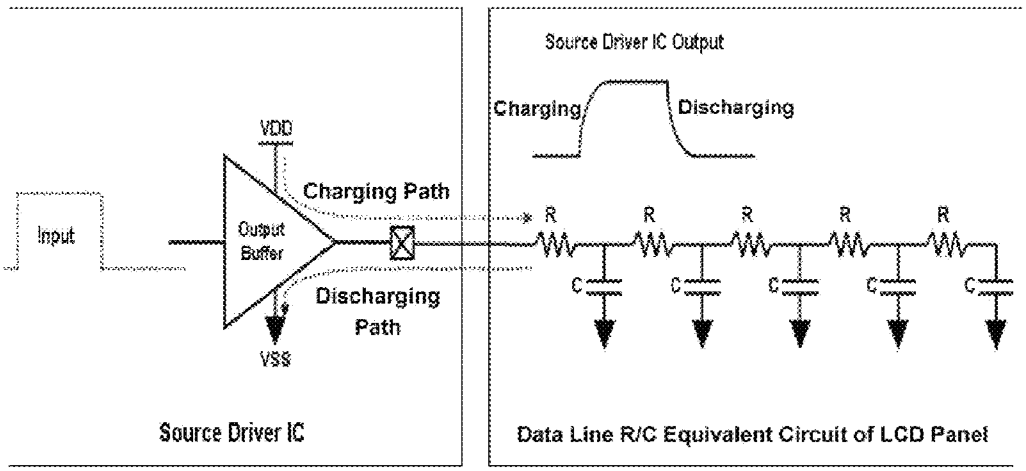
Fig.1 (Prior Art)
FIG. 1 is a view illustrating a current consuming process when a conventional LCD driving circuit drives a panel.

Reference will now be made in greater detail to preferred embodiments of the invention, examples of which are illustrated in the accompanying drawings. Wherever possible, the same reference numerals will be used throughout the drawings and the description to refer to the same or like parts.

The key idea of the present invention is to provide an LCD driving circuit with low current consumption, in which output buffers of an LCD driving circuit have terminals for a first voltage VDD and terminals for a second voltage VSS and share a terminal for an intermediate voltage $V_{COM}$ such that charges discharged during a discharging process of a first buffer can be used in a charging process of a second buffer, thereby reducing current consumption.

The present invention proposes a method of minimizing current consumption when an LCD driving circuit drives an LCD panel.

Figure 2:
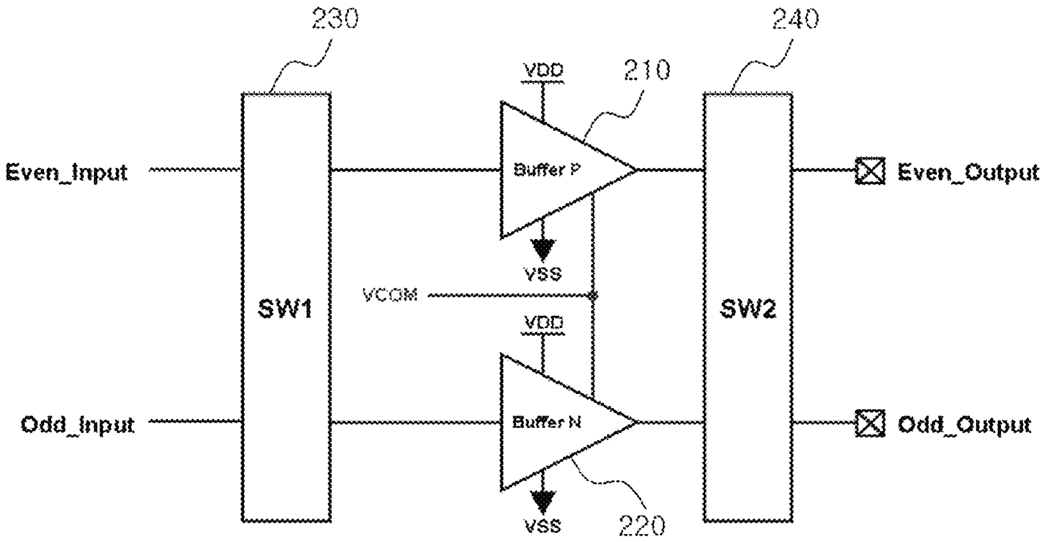
FIG. 2 is a block diagram illustrating the configuration of an LCD driving circuit with low current consumption in accordance with an embodiment of the present invention.

FIG. 2 is a block diagram illustrating the configuration of an LCD driving circuit with low current consumption in accordance with an embodiment of the present invention.

Referring to FIG. 2, an LCD driving circuit with low current consumption in accordance with an embodiment of the present invention includes a first buffer 210, a second buffer 220, a first switch 230, and a second switch 240.

The first buffer 210 is a buffer for driving a positive voltage level of an LCD panel, and has a terminal for a first voltage VDD as a high voltage level, a terminal for a second voltage VSS as a low voltage level, and a terminal for an intermediate voltage $V_{COM}$ as an intermediate voltage level. The terminal for the intermediate voltage $V_{COM}$ is connected to the discharging path of the first buffer 210.

The first buffer 210 is a buffer which outputs a positive voltage as a voltage having a magnitude greater than a predetermined intermediate voltage. The level of the positive voltage is in the range from the intermediate voltage $V_{COM}$ to the first voltage VDD.

The second buffer 220 is a buffer for driving a negative voltage level of the LCD panel, and has a terminal for the first voltage VDD as a high voltage level, a terminal for the second voltage VSS as a low voltage level, and a terminal for the intermediate voltage $V_{COM}$ as an intermediate voltage level. The terminal for the intermediate voltage $V_{COM}$ is connected to the charging path of the second buffer 220.

The second buffer 220 is a buffer which outputs a negative voltage as a voltage having a magnitude less than the predetermined intermediate voltage. The level of the negative voltage is in the range from the second voltage VSS to the intermediate voltage $V_{COM}$.

When the first buffer 210 is driven at the positive voltage level, the second buffer 220 is driven at the negative voltage level, and when the first buffer 210 is driven at the negative voltage level, the second buffer 220 is driven at the positive voltage level.

The intermediate voltage $V_{COM}$ has a voltage level in the range from the first voltage VDD and the second voltage VSS, and supplies a voltage to operate the first buffer 210 and the second buffer 220. In the case where the first buffer 210 is driven at the positive voltage level and the second buffer 220 is driven at the negative voltage level, the intermediate voltage $V_{COM}$ is connected to the discharging path of the first buffer 210 and the charging path of the second buffer 220, such that the discharging path of the first buffer 210 and the charging path of the second buffer 220 can share the intermediate voltage $V_{COM}$.

In the conventional art, terminals for supplying voltages to allow buffers to operate comprise two terminals for a first voltage VDD and a second voltage VSS. However, the present invention is distinguished from the conventional art in that each of the first buffer and the second buffer comprises three voltage terminals composed of the terminal for the first voltage VDD, the terminal for the second voltage VSS and the terminal for the intermediate voltage $V_{COM}$.

The first switch 230 serves as a switch for transmitting input signals Even_input and Odd_input to the first buffer 210 and the second buffer 220, and can be used for reversing polarities so as to prevent the locking of the LCD panel.

The second switch 240 serves as a switch for transmitting output signals Even_output and Odd_output of the first buffer 210 and the second buffer 220 to data lines of the LCD panel, and can be used for reversing polarities so as to prevent the locking of the LCD panel.

By crossing or shifting the inputs to the first buffer 210 and the second buffer 220, the first switch 230 and the second switch 240 can reverse the polarities of the LCD panel.

Figure 3:
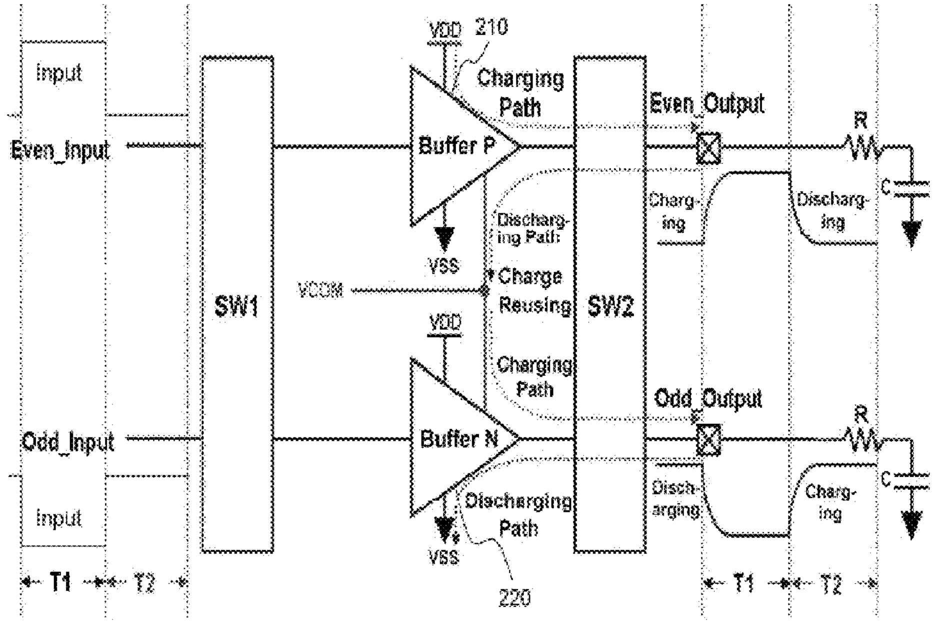
FIG. 3 is a view illustrating a way of reducing current consumption in the LCD driving circuit with low current consumption according to the present invention.

FIG. 3 is a view illustrating a way of reducing current consumption in the LCD driving circuit with low current consumption according to the present invention.

During a first interval T1, as the input signal Even_input to the first buffer 210 is received as a level higher than a previous input signal, the first buffer 210 is supplied with charges from the terminal for the first voltage VDD and charges and drives the R/C load of a data line of the LCD panel, and as the input signal Odd_input to the second buffer 220 is received as a level lower than a previous input signal, the second buffer 220 discharges the charges charged in the R/C load of a data line of the LCD panel.

During a second interval T2, as the input signal Even_input to the first buffer 210 is received as a level lower than a previous input signal, the first buffer 210 discharges the charges charged in the R/C load of the data line of the LCD panel through the terminal for the intermediate voltage $V_{COM}$, and as the input signal Odd_input to the second buffer 220 is received as a level higher than a previous input signal, the second buffer 220 is supplied with charges from the terminal for the intermediate voltage $V_{COM}$ and charges and drives the R/C load of the data line of the LCD panel.

Namely, the terminal for the intermediate voltage $V_{COM}$ connects the discharging path of the first buffer 210 and the charging path of the second buffer 220. Therefore, since the charges discharged from the R/C load of the data line connected to the first buffer 210 can be used for charging the R/C load of the data line connected to the second buffer 220, current consumption can be reduced.

Figure 4:
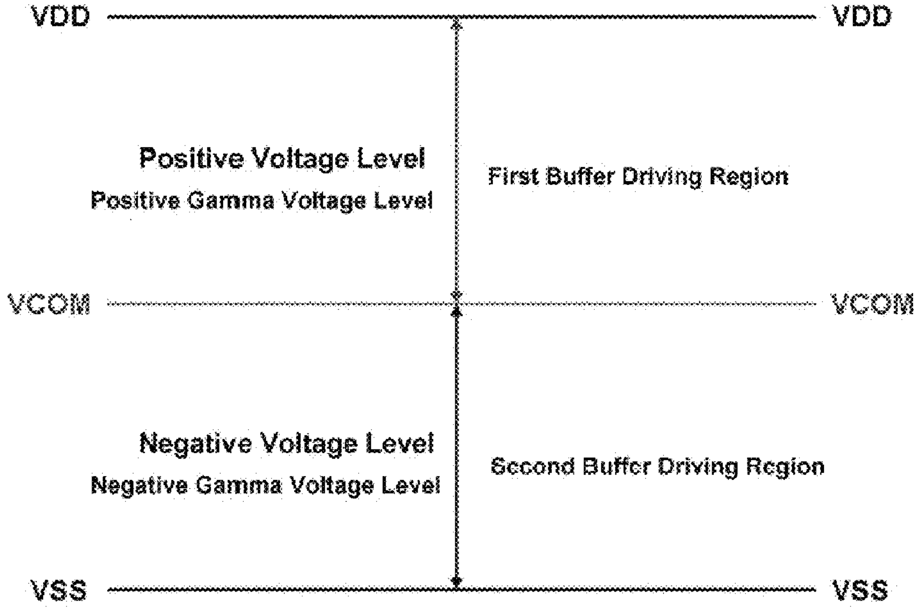
FIG. 4 is a view illustrating the ranges of driving voltages used in the LCD driving circuit with low current consumption according to the present invention.

FIG. 4 is a view illustrating the ranges of driving voltages used in the LCD driving circuit with low current consumption according to the present invention.

Referring to FIG. 4, it is to be noted that the first buffer 210 is driven in the range from the first voltage VDD to the intermediate voltage $V_{COM}$ and the second buffer 220 is driven in the range from the intermediate voltage $V_{COM}$ to the second voltage VSS.

Figure 5:
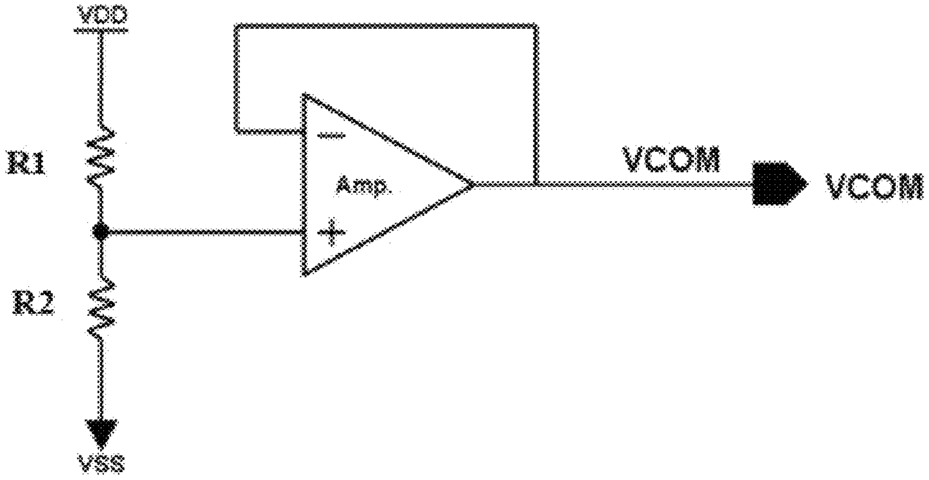
FIG. 5 is a circuit diagram illustrating an intermediate voltage generation unit of the LCD driving circuit with low current consumption according to the present invention.

FIG. 5 is a circuit diagram illustrating an intermediate voltage generation unit of the LCD driving circuit with low current consumption according to the present invention.

Referring to FIG. 5, an intermediate voltage generation unit of the LCD driving circuit with low current consumption according to the present invention includes a first resistor R1 having one end which is connected to the terminal for the first voltage VDD, a second resistor R2 having one end which is connected to the other end of the first resistor R1 and the other end which is connected to the terminal for the second voltage VSS, and an operational amplifier Amp. having a non-inverting terminal to which the common terminal of the first resistor R1 and the second resistor R2 is connected and an inverting terminal which is connected to the output terminal of the operational amplifier Amp.

By controlling the first resistor R1 and the second resistor R2, a voltage is divided and an intermediate voltage is generated, and by buffering the intermediate voltage through the operational amplifier Amp., the intermediate voltage $V_{COM}$) used in the LCD driving circuit according to the present invention is generated.

In order to improve voltage stability and driving capability, it is preferred that a capacitor be additionally provided to the output terminal of the operational amplifier Amp. Also, it is preferred that the operational amplifier Amp. comprise a unit gain buffer having voltage gain of 1.

Figure 6:
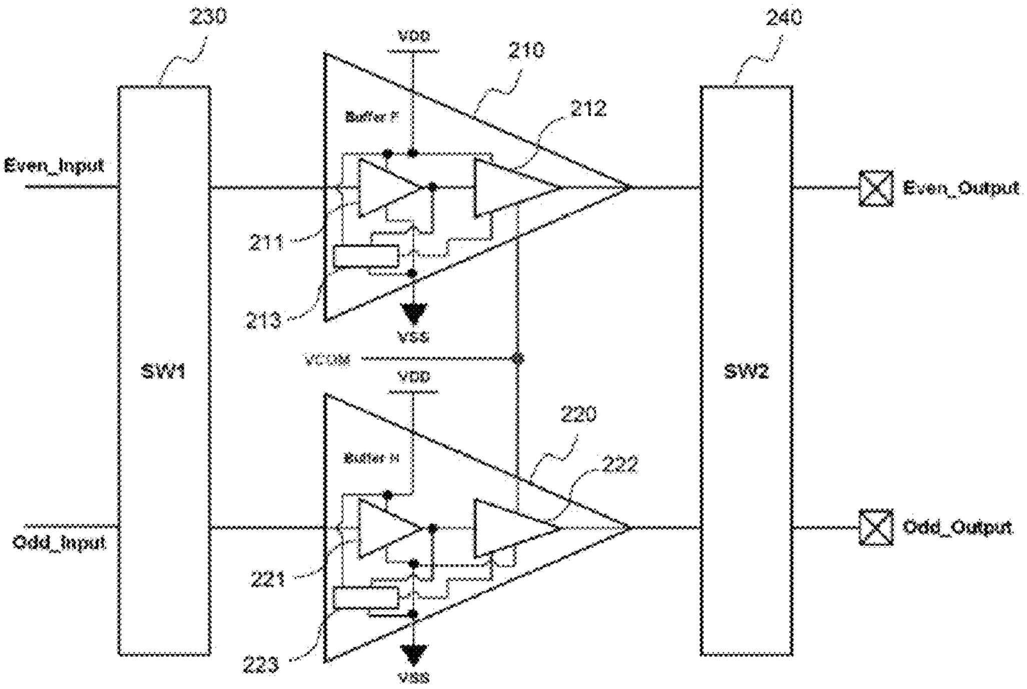
FIG. 6 is a view illustrating a way of sharing an output terminal in the LCD driving circuit with low current consumption according to the present invention.

FIG. 6 is a view illustrating a way of sharing an output terminal of buffers in the LCD driving circuit with low current consumption according to the present invention.

As shown in FIG. 6, the first buffer 210 and the second buffer 220 have input stage inverters, output stage inverters, and bias stages.

The first buffer 210 includes a first input stage inverter 211 which operates between the first voltage VDD and the second voltage VSS and inverts the input signal Even_input, a first output stage inverter 212 which operates between the first voltage VDD and the intermediate voltage $V_{COM}$ and inverts the output of the first input stage inverter 211, and a first bias stage 213 which operates between the first voltage VDD and the second voltage VSS and applies a bias voltage to the first output stage inverter 212.

The second buffer 220 includes a second input stage inverter 221 which operates between the first voltage VDD and the second voltage VSS and inverts the input signal Odd_input, a second output stage inverter 222 which operates between the intermediate voltage $V_{COM}$ and the second voltage VSS and inverts the output of the second input stage inverter 221, and a second bias stage 223 which operates between the first voltage VDD and the second voltage VSS and applies a bias voltage to the second output stage inverter 222.

It is to be understood that the first output stage inverter 212 of the first buffer 210 and the second output stage inverter 222 of the second buffer 220 share the intermediate voltage $V_{COM}$.

Figure 7:
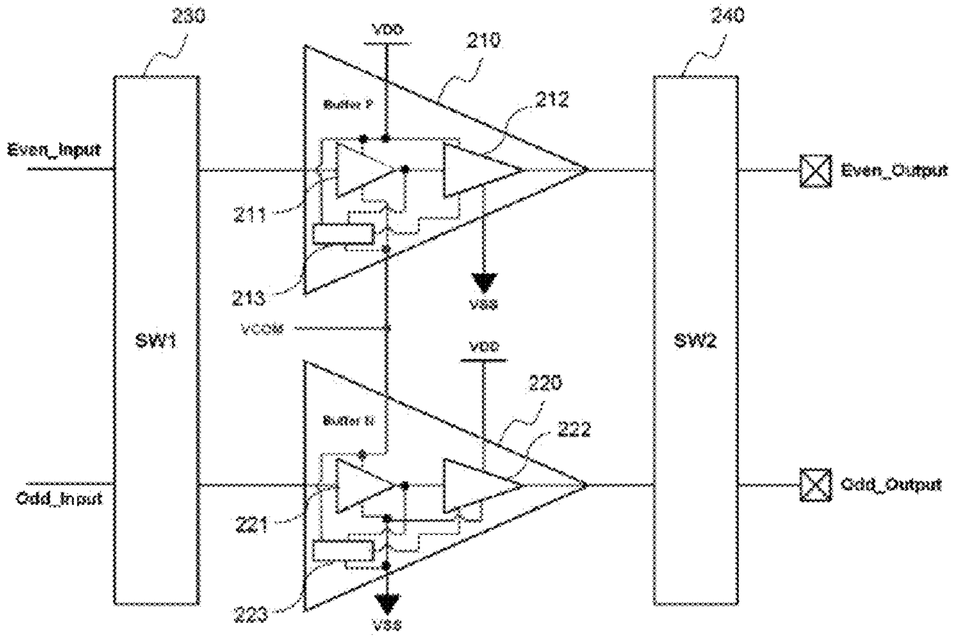
FIG. 7 is a view illustrating a way of sharing an input terminal in the LCD driving circuit with low current consumption according to the present invention.

FIG. 7 is a view illustrating a way of sharing an input terminal of buffers in the LCD driving circuit with low current consumption according to the present invention.

As shown in FIG. 7, the first buffer 210 and the second buffer 220 have input stage inverters, output stage inverters, and bias stages.

The first buffer 210 includes a first input stage inverter 211 which operates between the first voltage VDD and the intermediate voltage $V_{COM}$ and inverts the input signal Even_input, a first output stage inverter 212 which operates between the first voltage VDD and the second voltage VSS and inverts the output of the first input stage inverter 211, and a first bias stage 213 which operates between the first voltage VDD and the intermediate voltage $V_{COM}$ and applies a bias voltage to the first output stage inverter 212.

The second buffer 220 includes a second input stage inverter 221 which operates between the intermediate voltage $V_{COM}$ and the second voltage VSS and inverts the input signal Odd_input, a second output stage inverter 222 which operates between the first voltage VDD and the second voltage VSS and inverts the output of the second input stage inverter 221, and a second bias stage 223 which operates between the intermediate voltage $V_{COM}$ and the second voltage VSS and applies a bias voltage to the second output stage inverter 222.

It is to be understood that the first input stage inverter 211 and the first bias stage 213 of the first buffer 210 and the second input stage inverter 221 and the second bias stage 223 of the second buffer 220 share the intermediate voltage $V_{COM}$.

Figure 8:
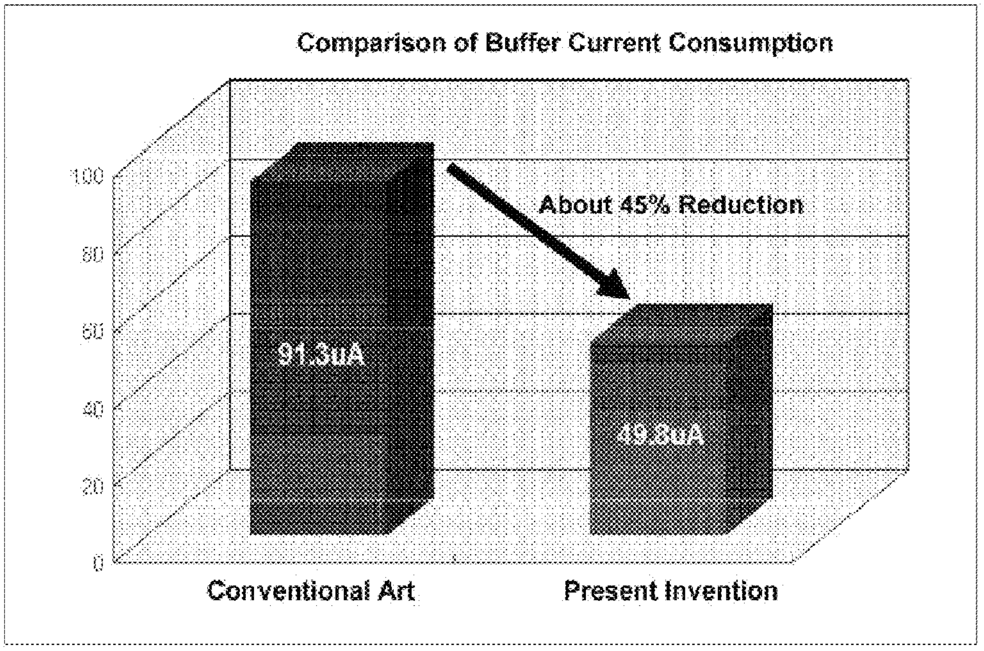
FIG. 8 is a view showing a current consumption reducing effect of the LCD driving circuit with low current consumption according to the present invention.
Figure 9:
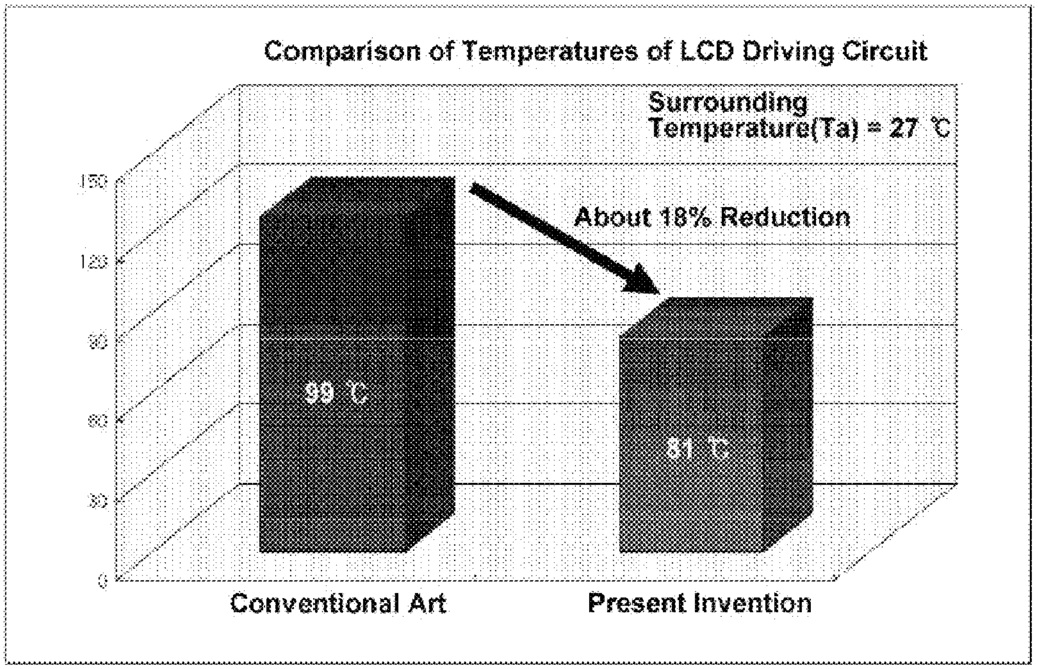
FIG. 9 is a view showing a temperature reducing effect of the LCD driving circuit with low current consumption according to the present invention.

FIG. 8 is a view showing a current consumption reducing effect of the LCD driving circuit with low current consumption according to the present invention, and FIG. 9 is a view showing a temperature reducing effect of the LCD driving circuit with low current consumption according to the present invention.

In order to demonstrate a current consumption reducing effect of the LCD driving circuit with low current consumption according to the present invention, current consumption of an LCD driving circuit and system was estimated through simulations. The data driving pattern as shown in FIG. 3 was used in the simulations.

In FIG. 8, a current consumption result of one buffer according to the conventional art and a current consumption result of one buffer according to the present invention, in which an average of the values of the first buffer and the second buffer is taken, were compared. It can be appreciated that the LCD driving circuit according to the present invention accomplishes about 45% of current consumption reducing effect when compared to the conventional art.

FIG. 9 is a view showing results obtained by conducting simulations for temperature reducing effects by taking an LCD driving circuit having 720 buffers as a model. It can be appreciated that the LCD driving circuit according to the present invention accomplishes about 18% of temperature reducing effect when compared to the conventional art.

As is apparent from the above description, the LCD driving circuit with low current consumption according to the present invention provides advantages in that, since current consumption and a temperature are reduced in an LCD driving circuit and system, the reliability and the lifetime of the LCD driving circuit and system can be improved and extended, and the available service time of a battery used in the LCD driving circuit and system applied to a mobile terminal can be lengthened.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. An LCD driving circuit comprising:

a first buffer configured to have a terminal for a first voltage, a terminal for a second voltage and a terminal for an intermediate voltage between the first voltage and the second voltage, and be driven at a first output terminal in a range from the first voltage to the intermediate voltage; and a second buffer configured to have a terminal for the first voltage, a terminal for the second voltage and a terminal for the intermediate voltage, and be driven at a second output terminal in a range from the intermediate voltage to the second voltage, wherein the terminal for the intermediate voltage of the first buffer and the terminal for the intermediate voltage of the second buffer are directly electrically connected with each other, and wherein the first voltage is a highest voltage, the second voltage is a lowest voltage, and the intermediate voltage is in a range from the first voltage to the second voltage.

2. The LCD driving circuit according to claim 1, wherein, when the first buffer is driven between the first voltage and the intermediate voltage as having positive voltage levels, the second buffer is driven between the intermediate voltage and the second voltage as having negative voltage levels, and wherein, when the first buffer is driven between the intermediate voltage and the second voltage as having negative voltage levels, the second buffer is driven between the first voltage and the intermediate voltage as having positive voltage levels.

3. The LCD driving circuit according to claim 2, wherein, when the first buffer is driven between the first voltage and the intermediate voltage as having positive voltage levels and the second buffer is driven between the intermediate voltage and the second voltage as having negative voltage levels, the intermediate voltage is commonly connected to a discharging path of the first buffer and a charging path of the second buffer.

4. The LCD driving circuit according to claim 1, further comprising:

an intermediate voltage generation unit including:

a first resistor having one end which is connected to the first voltage;

a second resistor having one end which is connected to the other end of the first resistor and the other end which is connected to the second voltage; and an operational amplifier having a non-inverting terminal to which a common terminal of the first resistor and the second resistor is connected and an inverting terminal which is connected to an output terminal of the operational amplifier, and configured to output the intermediate voltage.

5. The LCD driving circuit according to claim 4, wherein the intermediate voltage generation unit controls the intermediate voltage by regulating the first resistor and the second resistor.

6. The LCD driving circuit according to claim 4, wherein the intermediate voltage generation unit further includes a capacitor which is provided to the output terminal of the operational amplifier.

7. The LCD driving circuit according to claim 4, wherein the operational amplifier has voltage gain of 1.

8. The LCD driving circuit according to claim 1, further comprising:

a first switch configured to transmit input signals to the first buffer and the second buffer.

9. The LCD driving circuit according to claim 8, wherein the first switch can reverse polarities of an LCD panel.

10. The LCD driving circuit according to claim 9, wherein the first switch can reverse the polarities of the LCD panel by crossing or shifting inputs to the first buffer and the second buffer.

11. The LCD driving circuit according to claim 1, further comprising:

a second switch configured to transmit output signals of the first buffer and the second buffer to data lines of the LCD panel.

12. The LCD driving circuit according to claim 11, wherein the second switch can reverse the polarities of the LCD panel.

13. The LCD driving circuit according to claim 12, wherein the second switch can reverse the polarities of the LCD panel by crossing or shifting the inputs to the first buffer and the second buffer.

14. The LCD driving circuit according to claim 1, wherein the first buffer and the second buffer have voltage gain of 1.

15. The LCD driving circuit according to claim 1, wherein the first buffer comprises:

a first input stage inverter configured to operate between the first voltage and the second voltage and invert the input signal;

a first output stage inverter configured to operate between the first voltage and the intermediate voltage and invert an output of the first input stage inverter; and a first bias stage configured to operate between the first voltage and the second voltage and apply a bias voltage to the first output stage inverter.

16. The LCD driving circuit according to claim 15, wherein the second buffer comprises:

a second input stage inverter configured to operate between the first voltage and the second voltage and invert the input signal;

a second output stage inverter configured to operate between the intermediate voltage and the second voltage and invert an output of the second input stage inverter; and a second bias stage configured to operate between the first voltage and the second voltage and apply a bias voltage to the second output stage inverter.

17. The LCD driving circuit according to claim 16, wherein the terminal for the intermediate voltage of the first buffer and the terminal for the intermediate voltage of the second buffer are connected with each other.

18. The LCD driving circuit according to claim 1, wherein the first buffer comprises:

a first input stage inverter configured to operate between the first voltage and the intermediate voltage and invert the input signal;

a first output stage inverter configured to operate between the first voltage and the second voltage and invert an output of the first input stage inverter; and a first bias stage configured to operate between the first voltage and the intermediate voltage and apply a bias voltage to the first output stage inverter.

19. The LCD driving circuit according to claim 18, wherein the second buffer comprises:

a second input stage inverter configured to operate between the intermediate voltage and the second voltage and invert the input signal;

a second output stage inverter configured to operate between the first voltage and the second voltage and invert an output of the second input stage inverter; and a second bias stage configured to operate between the intermediate voltage and the second voltage and apply a bias voltage to the second output stage inverter.

20. The LCD driving circuit according to claim 19, wherein the terminal for the intermediate voltage of the first buffer and the terminal for the intermediate voltage of the second buffer are connected with each other.

* * * * *